(12) United States Patent
Funahata et al.

(10) Patent No.: US 6,538,711 B2
(45) Date of Patent: Mar. 25, 2003

(54) METHOD OF MANUFACTURING REFLECTIVE LIQUID CRYSTAL DISPLAY DEVICE

(75) Inventors: Katsuyuki Funahata, Hitachi (JP); Shinichi Komura, Hitachi (JP); Kazuhiro Kuwabara, Hitachi (JP); Osamu Itou, Hitachi (JP); Katsumi Kondo, Mito (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/042,209

(22) Filed: Jan. 11, 2002

(65) Prior Publication Data

US 2002/0054259 A1 May 9, 2002

Related U.S. Application Data (63) Continuation of application No. 09/361,965, filed on Jul. 28, 1999.

(30) Foreign Application Priority Data

Jul. 31, 1998 (JP) .............................. 10-217574

(51) Int. Cl.⁷ ...................... G02F 1/1335; B44C 1/165; B32B 31/00; B41M 3/12
(52) U.S. Cl. ...................... 349/113; 156/230; 156/247; 427/146
(58) Field of Search .................. 349/113; 156/230, 156/240, 241, 247, 289; 427/146, 147, 148

(56) References Cited

U.S. PATENT DOCUMENTS

| | | | |
|---|---|---|---|
| 5,757,451 A | 5/1998 | Miyazaki et al. | |
| 5,757,459 A | 5/1998 | Nishizaki et al. | |
| 5,815,232 A | 9/1998 | Miyazaki et al. | |
| 5,969,784 A | 10/1999 | Miyazaki et al. | |
| 5,978,061 A | 11/1999 | Miyazaki et al. | |
| 6,061,111 A | 5/2000 | Kataoka et al. | |
| 6,078,372 A | 6/2000 | Kim | |
| 6,141,073 A | 10/2000 | Sasaki et al. | |
| 6,151,089 A | 11/2000 | Yang et al. | |

FOREIGN PATENT DOCUMENTS

| | | |
|---|---|---|
| JP | 03-223715 | 10/1991 |
| JP | 04-243226 | 8/1992 |
| JP | 05-080327 | 4/1993 |
| JP | 05-232465 | 11/1993 |
| JP | 09-080426 | 3/1997 |
| JP | 10-177106 | 6/1998 |
| JP | 11-142878 | * 5/1999 |
| JP | 11-338134 | 12/1999 |

* cited by examiner

Primary Examiner—William L. Sikes
Assistant Examiner—Dung Nguyen
(74) Attorney, Agent, or Firm—Antonelli, Terry, Stout & Kraus, LLP (57) ABSTRACT

A liquid crystal display device includes two electrode substrates and a liquid crystal layer laid between these substrates. One electrode is composed of a glass substrate with a plastics layer having plural convex portions or convex and concave portions randomly formed thereon and a lamination of a reflector, an insulating and flatting layer, a transparent electrode, and alignment layer formed on the plastics layer. The other electrode substrate is composed of a glass substrate and a lamination of a transparent electrode and alignment layer formed on the glass substrate. Both of the electrode substrates are located in a manner to allow the alignment layer of them to be opposed to each other.

5 Claims, 9 Drawing Sheets

METHOD OF MANUFACTURING REFLECTIVE LIQUID CRYSTAL DISPLAY DEVICE

This application is a continuation of application Ser. No. 09/361,965, filed Jul. 28, 1999.

BACKGROUND OF THE INVENTION

The present invention relates to a liquid crystal display device, and more particularly to the reflector-contained liquid crystal display device having an effective function for reflective color display and the manufacture of the liquid crystal display device.

As a conventional reflective type color liquid crystal display device, some methods for manufacturing the device have been proposed as disclosed in JP-A-3-223715, JP-A-5-80327, and JP-A-4-243225. In those methods, a rugged (convexo-concave) surface is formed under a reflecting film. Those methods are used for simply manufacturing the liquid crystal display device (often called LCD) having the diffused reflecting film built therein.

The structures formed by those methods are (1) a structure composed of an aluminum thin film formed on a ground glass surface, (2) a two-layered structure composed of a reflective electrode and a thin film layer having a different thermal expansion coefficient from the reflective electrode, and (3) a structure-composed of a reflecting film formed on a surface with lots of fine convex portions formed by plastics. Those structures each use both the reflector and the electrode.

SUMMARY OF THE INVENTION

In the foregoing prior art (1), the fine convex and concave portions are formed on a glass substrate by means of the sandblast technique, for example. In the foregoing prior art (2), the fine convex and concave portions are formed on the reflecting film surface by means of stress caused by the difference of a thermal expansion coefficient between the reflecting film and the plastics formed under the reflecting film.

Further, those reflecting films are patterned and served as both the reflector and the electrode.

However, those methods have problems of (1) inferior reproducibility of the fine rugged pattern, (2) difficulty in patterning the reflecting film, (3) difficulty in forming a color filter on the reflecting film, and so forth.

Further, the foregoing structure (3) is formed with a photo polymer by means of the photo-lithography technique. It means that the manufacturing process is complicated and has lots of steps. The manufacturing process is therefore very costly. Moreover, since the reflector is also served as an electrode, the composition where a color filter is formed on the reflector disadvantageously results in lowering a voltage to be applied to the liquid crystal.

The foregoing structures (2) and (3) include a plastics layer under an electrode terminal. In the connecting process of heating and pressing a tape carrier package (called a TCP through the rest of this description) having a liquid crystal driver IC mounted thereon through a conductive layer, therefore, those structures are likely to bring about a bad connection and film strip in the electrode terminal. Moreover, those structures have difficulty in re-connection as well.

It is an object of the present invention to provide a diffused reflector from which the foregoing disadvantages are removed, a liquid crystal display device constructed to use the diffused reflector, and a manufacture of the liquid crystal display device.

In order to achieve this object, the present invention is composed as follows:

[1] A diffused reflector composed of a substrate, a rugged thin film formed on the substrate, and a reflecting layer formed on the rugged thin film, the thin film layer being integrated with the reflecting layer in advance.

[2] The diffused reflector of [1] having an adhesive layer for bonding the thin film and the reflecting layer.

[3] A diffused reflector composed of a substrate and a diffused reflecting layer transcribed onto and bonded with the substrate by a transcription film.

[4] A diffused reflector composed of a substrate, a rugged thin film formed on the substrate, a reflecting layer formed on the rugged thin film, and a flatting layer formed on the reflecting layer, the thin film layer being integrated with the reflecting layer in advance and the thin film layer being bonded with the substrate by an adhesive layer.

[5] The diffused reflector of [4] having the thin film served as the adhesive layer.

[6] A liquid crystal display device composed of a pair of substrates, a liquid crystal layer laid between the pair of substrates, an adhesive layer formed on one of the pair of substrates, a rugged thin film formed on this adhesive layer, a reflecting layer formed on the rugged thin film, and a flatting layer formed on this reflecting layer, and an electrode structure for generating an electric field in the liquid crystal located between the flatting layer and the other one of the pair of substrates.

[7] A liquid crystal display device composed of one electrode substrate a having a glass substrate, a plastics layer with convex portions or convex and concave portions randomly formed on the glass substrate, a lamination of a reflector, an insulating and flatting layer, a transparent electrode, and alignment layer formed on the plastics layer and the other electrode substrate b having a transparent electrode and alignment layer laminated on the glass substrate, the electrode substrates a and b being located so that the alignment layer of them are opposed to each other and having a liquid crystal layer laid there between.

[8] The liquid crystal display device of [7] having a shading layer and a color filter formed on the insulating and flatting layer and the liquid crystal having its thickness regulated by plural plastics columns formed on the shading layer.

[9] A method for manufacturing the liquid crystal display device including the steps of locating one electrode electrode a formed by the substeps of forming a thin plastics layer on the glass substrate and forming fine convex portions or convex and concave portions on the plastics layer by heating and pressing the surface of the plastics layer with a pattern having lots of fine convex portions or convex and concave portions formed thereon, forming the reflecting film on the plastics layer and the insulating and flatting layer on the reflecting film, forming the shading layer and the color filter on the insulating and flatting layer, forming the flatting layer on the color filter, forming the transparent electrode on the flatting layer, forming the alignment layer of the liquid crystal on the transparent electrode, and the other electrode substrate b formed by the substeps of forming the transparent electrode on the glass substrate and forming the alignment layer.of the liquid crystal on the transparent electrode in a manner to oppose the alignment layer of the electrode substrates a and b to each other; filling liquid crystal between both of the electrode substrates; and sealing the liquid crystal therebetween.

[10] The manufacturing method for the liquid crystal display of [9] including the steps of forming lots of fine convex portions or convex and concave portions on the surface of the glass substrate; heating and pressing a transcription film having a photo or thermoset plastics layer laminated on a polymer base film with lots of fine convex portions or convex and concave portions formed at random; and stripping the polymer base film off the glass substrate.

[11] The manufacturing method for the liquid crystal display device of [9] or [10] further including the step of forming plural plastics columnar portions for regulating the thickness of the liquid crystal layer on the shading layer formed on the flatting layer.

DESCRIPTION OF THE EMBODIMENTS

The description will be oriented to the concrete method for manufacturing a reflective color liquid crystal display device constructed to use a diffused reflector according to the present invention, a diffused reflector with a shading layer, or a ground film. The liquid crystal display cell is completed by the steps of:

forming one electrode substrate by the substeps of;
(1) forming a transcription film having photo or thermoset plastics coated (thickness: 1 to 3 $\mu$m) and dried on a polymer base film on which lots of fine convex portions or convex and concave portions (pitch: 10 to 30 $\mu$m and height or depth: 1 to 2 $\mu$m) at random, and pasting (rolling speed: 0.1 to 3 m/min.) the thin film of photo or thermoset plastics of the transcription film with a glass substrate surface by adding heat (50 to 150° C.) and pressure from a polymer base film served as a supporter by means of a roll laminator or the like,
(2) stripping the polymer base film served as a supporter off the glass substrate,
(3) forming a reflecting film (composed of aluminum or silver, thickness: 100 to 300 nm) on a plastics film having convex portion or convex and concave portions formed thereon,
(4) forming an insulating and flatting film (thickness: 1 to 2 $\mu$m) on the reflecting film,
(5) forming a shading film (thickness: 0.5 to 2 $\mu$m) on the insulating film,
(6) forming red, green and blue color filters (thickness: 0.5 to 2 $\mu$m) on the shading film,
(7) forming a flatting layer (thickness: 1 to 3 $\mu$m) on the color filter,
(8) forming an ITO (Indium Tin Oxide) film (100 to 300 nm) served as a transparent electrode on the flatting film, and
(9) forming alignment layer (50 to 150 nm) on the transparent electrode, forming on the glass substrate the other electrode substrate by the substeps of;
(10) forming a transparent electrode, and
(11) forming alignment layer (50 to 150 nm) on the transparent electrode,
(12) combining both of the electrode substrates with each other with a spacer (polymer beads, silica beads, glass cellulose) so that the alignment layer of the substrates are opposed to each other and bonding them around the electrode substrates with a sealing member (formed by compounding the spacer in the epoxy type resin) and sealing them; and
(13) sealing liquid crystal between the electrode substrates.

Then, the liquid crystal display device according to the present invention is completed by the steps of:
(14) pasting a given retardation plate and a given polarizer on the glass substrate surface on which only the transparent electrode of the liquid crystal display cell is formed;
(15) connecting a TCP having an IC for driving the liquid crystal and a connecting terminal with the driving external circuit to the liquid crystal display cell; and
(16) incorporating the liquid crystal display cell in a case, a frame or the like.

Further, as the second feature of the present invention, in place of the polymer base film having lots of fine convex portions or convex and concave portions formed at random, provided in the foregoing item (1), it is possible to use a pattern having as a basic pattern a roller, a stamper, or a polymer sheet having given convex portions or convex and concave portions.

Concretely, this method includes the steps of:
(1) forming a thin film of plastics (thickness: 1 to 3 $\mu$m) by coating the plastics on the glass substrate and drying it, and (2) stamping a pattern having convex portions or convex and concave portions onto a thin plastics layer with the pattern having lots of fine convex portions or convex and concave portions located at random by applying heat and press.

The following steps are analogous to those described in the items (3) to (16).

The present invention makes it possible to greatly reduce the manufacturing steps as compared with those of the prior art by using a film (called a diffused reflector integrated color filter) having a lamination of a pigment (black, red, green or blue) dispersed photo polymer layer, a reflecting layer, and a plastics layer on a polymer base film or a film (called a color filter film) having a lamination of a photo polymer film with red, green and blue pigment dispersed therein on the polymer base film.

Further, the present invention also makes it easy to form the electrodes on the opposed substrate and thus to modify the electrodes and connect the TCP because no shading film or color filter is required to be formed on the opposed substrate having no reflector.

In the present invention, for forming a lamination of a plastics layer and a reflecting layer or a lamination of a plastics layer, a reflecting layer and a shading layer on the glass substrate, a simple method may be provided for pasting on the polymer base film a transcription film on which the former or the latter lamination is formed in advance.

Further, by forming a finely shaped signal electrode with lots of electrodes on one electrode substrate, for example, the modification of the electrode and the repair in connecting the TCP are made easy. This leads to enhancing the yields and lowering the cost.

Moreover, a shading layer may be formed by laminating on the glass substrate a color filter film with a diffused reflector composed by laminating a reflecting film and a black photo film on a polymer base film having a plastics layer with convex portions or convex and concave portions formed thereon and then exposing the black photo film through the photo-mask, developing, and curing the exposed film.

The first color filter is patterned by laminating the color filter film on the glass substrate or spin-coating the photo plastics film with red, green or blue pigment dispersed thereon (called a color resist) and then exposing the film through the photo-mask, developing, and curing the exposed film.

Then, the second and the third color filters are formed in the similar manner.

After forming a flatting layer for making the surfaces of the first, the second and the third color filters tabular, a transparent electrode pattern composed of an ITO film is formed on the flatting layer.

By forming the alignment layer (polyimide type resin) for controlling the alignment of the liquid crystal molecules on the transparent electrode and rubbing the alignment film with the known means for keeping the alignment in order, the other electrode substrate may be produced.

The diffused reflector according to the invention may have convex portions or convex and concave portions by a convenient film transcription without using the photo-lithography technique. Then, by forming a reflecting layer composed of aluminum or silver on top of the diffused reflector, the resulting diffused reflector to be incorporated in the LCD device may be produced. Hence, the LCD device having the diffused reflector built therein may be manufactured with smaller number of steps and at lower cost than the prior art.

According to the present invention, unlike the prior art where one layer is served as the electrode and the reflector, the electrode may be separated from the reflector. Hence, the patterning of the metallic electrode is made quite easy. This composition makes it possible to form the other components, in particular, the color filter and the shading film (also called a black matrix) on the substrate with the reflector formed thereon between the electrode and the built-in reflector without having to lower the voltage applied to the liquid crystal layer.

Since those components such as the color filter and the black matrix may be formed on the substrate on which the diffused reflector is formed, the components on the opposed substrate are reduced in number, so that the repair of the electrode to be formed on the opposed substrate is made easier. In particular, due to the fact that the signal electrode with lots of electrodes and narrow pitches is directly formed on the glass substrate, the connection of the TCP having the IC for driving the liquid crystal and the repair of the IC are made advantageously easier.

In a case that a method of pasting the transcription film is employed as a method for forming the diffused reflector, it reduces the manufacturing steps in number and makes the repair of the glass substrate easy, thereby lowering the cost as well as flatting the diffused reflecting side of the diffused reflector. This serves to improve gap accuracy between both of the substrates and flat the members to be formed between the liquid crystal layer and the substrate.

In turn, the description will be oriented to a reflective LCD cell that is preferably suitable for an embodiment of the present invention. In this invention, the description will be expanded mainly along a ½ VGA hand-held personal computer (called a hand-held PC) having a display scale of 640×240 dots (pixel pitch: 0.3 mm. ×0.3 mm, pixel size: 0.288 mm×0.288 mm, screen diagonal size: 8.1 inch), a super twisted nematic (STN) liquid crystal display device used mainly for a monitor, or a reflective STN color liquid crystal display device (simply called a reflective color LCD device).

The present invention does not depend on the driving system of the liquid crystal contained in the LCD device. Hence, it is not limited to the STN LCD system and may apply to any one of an active addressing system and a passive system.

The reflective LCD device will be concretely described below along the embodiments.

First Embodiment

One example of the manufacture of the reflective LCD cell according to the invention will be described with reference to the diagrammatic sections of the steps (a) to (h) shown in FIGS. 1A to 1H.

Figure 1A:
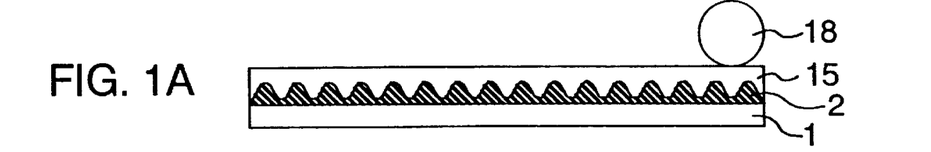
FIGS. 1A to 1H are diagrammatic sections showing a process for manufacturing a reflective color liquid crystal display device according to a first embodiment of the present invention.

Step (a): A transcription film is prepared by coating (coat thickness: 1.5 $\mu$m) a plastics layer 2 composed of acrylic resin (epoxy type resin or imide type resin, or photo or non-photo plastics layer) on a polymer film 15 served as a supporter having lots of concave portions on the surface thereof (polyethylene terephthalate, thickness: 50 $\mu$m, concave pitch: about 15 $\mu$m, concave depth: 1.2 $\mu$m), drying the coat, and then forming a protective film (not shown, polyethylene, thickness: 6 $\mu$m) on the plastics layer 2.

The transcription film is transcribed on a glass substrate 1 (soda glass, thickness: 0.7 mm) with a roller laminator 18 (substrate temperature: 100° C., roller temperature: 100° C., roller pressure: 6 kg/cm$^2$, feed speed: 0.5 m/min,). Next, the main curing (240° C./30 min,) is done and the protective film is stripped off the plastics layer 2 for forming the plastics layer 2 having concave portions.

Figure 1B:
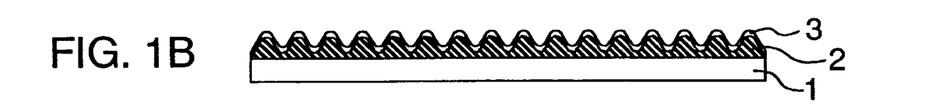

Step (b): A reflecting layer 3 composed of aluminum (Instead, silver may be used. Thickness: 100 nm) is formed on the plastics layer 2 having lots of concave portions.

Figure 1C:
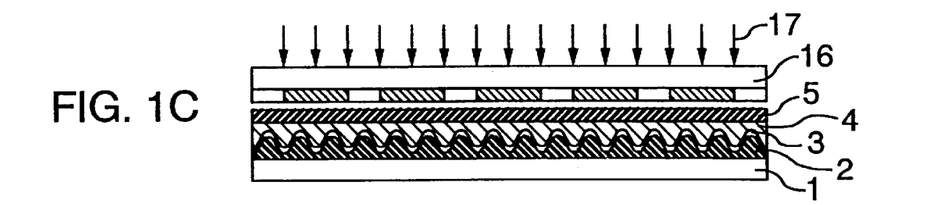

Step (c): An insulating and flatting layer 4 composed of acrylic resin (thickness: 2 μm) is formed on the reflecting layer 3.

Figure 1D:
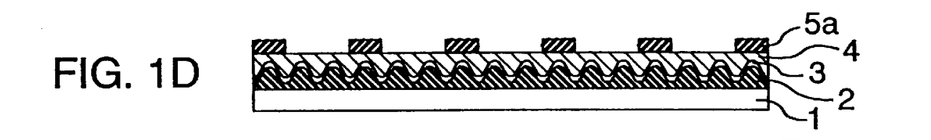

Step (d): A shading layer 5a (thickness: 1.2 μm) composed of acrylic resin (or epoxy type resin) is formed by coating a black pigment-dispersed photo polymer layer on the insulating and flatting layer 4, applying ultraviolet light 17 to the coated layer 5 through a photo-mask for exposing the layer 5 and developing it.

Figure 1E:
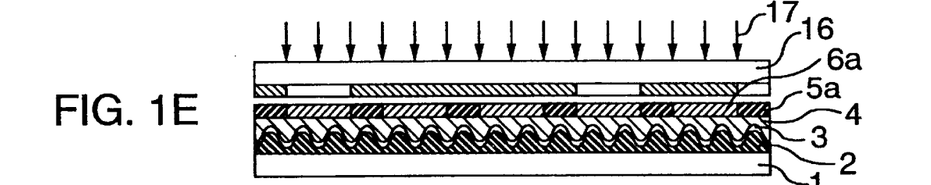

Step (e): A photo plastics layer 6 (thickness: 1.2 μm) composed of acrylic resin (or epoxy type resin) is coated on the shading layer 5a by a mother member having red pigment particles dispersed therein. The ultraviolet light 17 is applied to the photo plastics layer 6 through the photomask 16 for exposure. Then, the exposed layer 6 is developed.

Figure 1F:
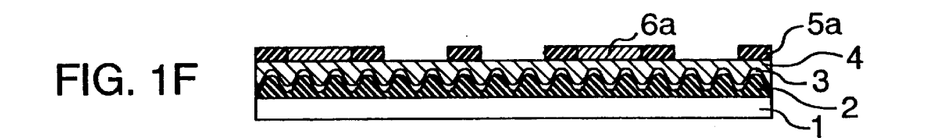

Step (f): A red colored layer 6a is formed from the photo plastics layer 6.

Figure 1G:
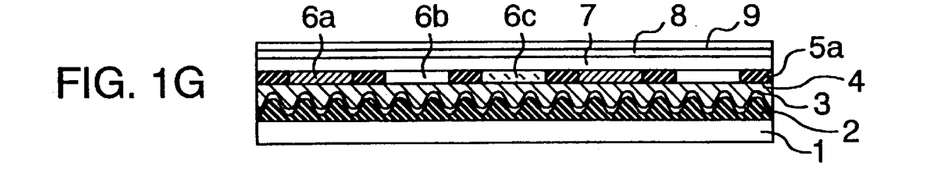

Step (g): Next, like the red colored layer 6a, a green colored layer 6b and a blue colored layer 6c are formed in sequence. Then, a flatting layer 7 (thickness: 2 μm) composed of acrylic resin (or epoxy type resin), a transparent electrode 8 (ITO film with a thickness of 260 nm; scanning electrode with electrode number of 240, electrode pitch of 300 μm, electrode width of 288 μm and electrode gap of 12 μm), and polyimide alignment layer (thickness: 70 μm) are formed on the shading layer 5a and the colored layers 6a, 6b and 6c.

Figure 1H:
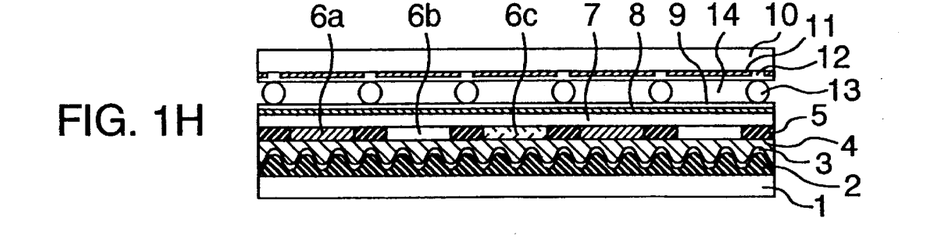

Step (h): One electrode substrate formed at the foregoing steps (a) to (g) and the other electrode substrate are located in a manner to allow both of the electrodes 8 and 11 to be opposed to each other and are combined with a spacer 13 composed of polymer beads (grain diameter of 6 μm) corresponding to the thickness of a liquid crystal layer. The other electrode substrate includes a lamination of a transparent electrode 11 (ITO film with thickness of 260 nm; signal electrode with electrode number of 1920, electrode pitch of 100 μm, electrode width of 88 μm, electrode gap of 12 μm), and polyimide alignment layer 12 (thickness: 700 nm) formed on a glass substrate 10 (soda glass, thickness: 0.7 mm).

Then, the reflective LCD cell is manufactured as follows. The portion around the substrate is sealed by a sealing material containing polymer beads (or glass fiber) mixed in the epoxy type resin. Liquid crystal 14 (liquid crystal mixture composed of cyano PCH and transfer derivative, index anisotropy Δn: 0.133, twisted angle: 250°) is injected and sealed (photo acrylic resin or photo epoxy type resin) for manufacturing the reflective LCD cell.

In this embodiment, the ground layer of the diffused reflector is composed by locating lots of fine convex (semi-spherical) resin portions with a diameter of 15 μm and a height of 1.2 μm at random so as to avoid light interference and forming an aluminum film with a thickness of 100 nm as a reflecting film. The material, the form and the size of the convex resin portion may be selected according to the purpose.

According to this embodiment, the plastics layer of the diffused reflector composed by the filter transcription method may have the desired shape formed at the same precision as the shape by the photo-lithography technique. Hence, this embodiment may provide the reflective color LCD device with the diffused reflector built therein at low cost. Further, by incorporating the diffused reflector, the reflective color LCD device may be provided for displaying a high-contrast and bright image if viewed from every direction.

In particular, since the pixel electrode is separated from the reflector, even the cell composition wherein the color filters are formed on the reflector may provide a reflective LCD device that keeps the voltage applied on the liquid crystal constant.

Without having to use the photo-lithography method by which the manufacture is made complicated, it is possible to easily form a desired pattern on the transcription film with excellent reproducibility by using the pattern.

Since the signal electrode with a narrow electrode width and location pitch is directly formed on the glass substrate, the mount and the repair of the TCP on which the IC for driving the liquid crystal is mounted is made easy. This is effective in improving the yields in manufacturing the liquid crystal cell.

Moreover, by using the transcription film having the shading layer, the reflecting layer, and the plastics layer laminated on the polymer base film having fine convex or concave portions in the describing sequence, it is possible to greatly reduce the manufacturing steps in number. Further, by using the transcription film for the colored layer, the surface of the colored layer is made flat, which outputs a totally even and high-contrast image.

Further, the insulating and flatting layer 4 or the flatting layer 7 may be adopted according to the purpose. For example, if the layer is formed only on the effective display area, the TAB connection is made more advantageous.

By locating the insulating layer between the alignment layer and any one of the transparent electrodes, the similar effect may be obtained.

The manufacturing method of the diffused reflector according to the invention includes the steps of pre-forming a convex or concave and convex original pattern on a roll, a plate or a sheet, transcribing the pattern on a thin plastics layer, and forming the reflecting film on the plastics layer. This manufacturing method may easily provide the diffused reflector with excellent pattern reproducibility.

Second Embodiment

In turn, the description will be oriented to an example of the manufacturing method of another reflective LCD device according to the invention along the steps (a) to (h) shown in FIGS. 2A to 2H.

Figure 2A:
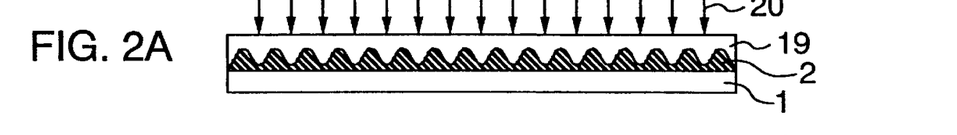
FIGS. 2A to 2H are diagrammatic sections showing a process for manufacturing a reflective color liquid crystal display device according to a second embodiment of the present invention.

Step (a): A plastics layer 2 (thickness: 1.5 μm) composed of acrylic resin is formed on the glass substrate 1 (soda glass, thickness: 0.7 mm) by means of a spinner coating method and then is dried.

Next, heat and press 20 (temperature: 100° C., pressure: 6 Kg/cm²) is applied on the plastics layer 2 by using a plate-shaped pressing die 19 having concave portions or convex and concave portions formed thereon (not shown, concave pitch: about 15 μm, and concave depth: 1.2 μm) for transcribing the pattern onto the plastics layer 2. Then, the plastics layer 2 is hardened for 30 min. in a thermostatic oven (240° C.) for forming the convex pattern.

Figure 2B:
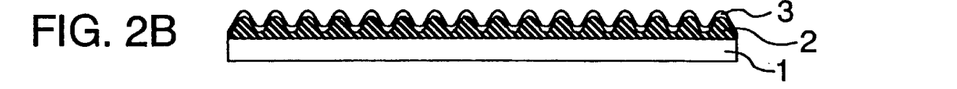
Figure 2C:
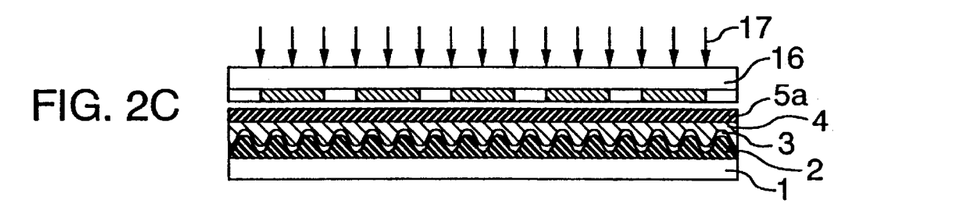
Figure 2D:
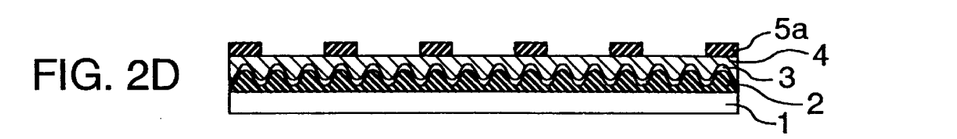
Figure 2E:
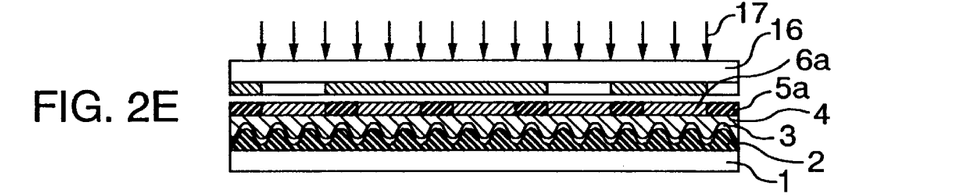
Figure 2F:
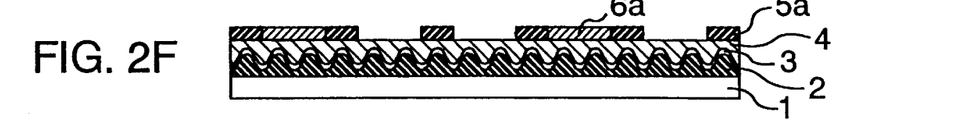
Figure 2G:
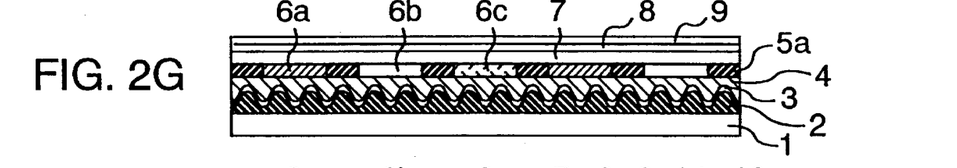
Figure 2H:
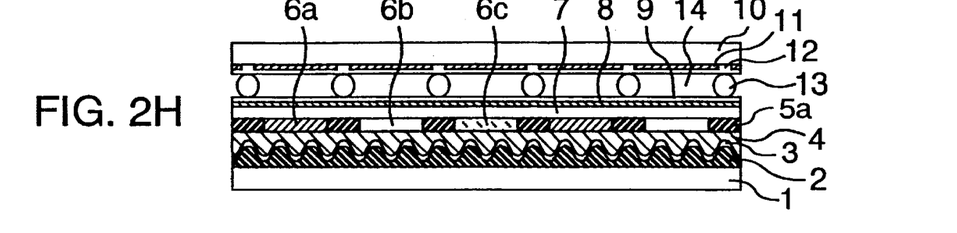

The process at the step (b) or lower is executed like the first embodiment for manufacturing the reflective LCD device. Further, the ground layer of the diffused reflector is the same as that of the first embodiment.

Though the photo-lithography technique disallows the unfavorable portions to be checked after the overall process is completed, this embodiments allows the unfavorable portions to be immediately checked because the predetermined concave portions or convex and concave portions are transcribed onto the semi-cured plastics layer 2 at the initial step (a). Hence, the reproduction of the glass substrate may be done easily and immediately. This is quite advantageous to lowering the cost.

Third Embodiment

In turn, the description will be oriented to an example of the manufacturing method of another reflective LCD device according to the invention along the steps (a) to (h) shown in FIGS. 3A to 3H.

Figure 3A:
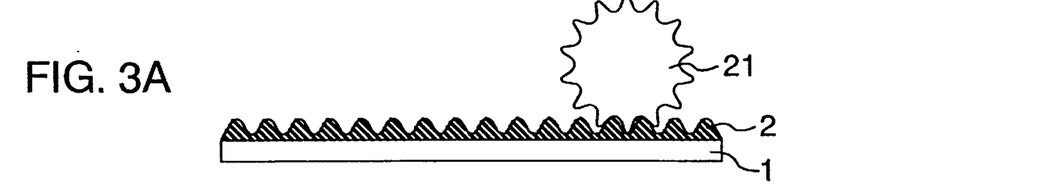
FIGS. 3A to 3H are diagrammatic sections showing a process for manufacturing a reflective color liquid crystal display device according to a third embodiment of the present invention.

Step (a): By using a roll (roll-shaped pressing die) 21, the concave portions or the convex and concave portions formed on the surface of the roll are transcribed onto the plastics layer 2 formed on the glass substrate 1 in the similar manner to the second embodiment.

Figure 3B:
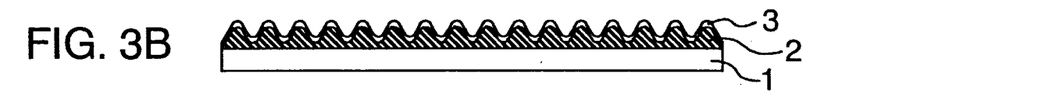
Figure 3C:
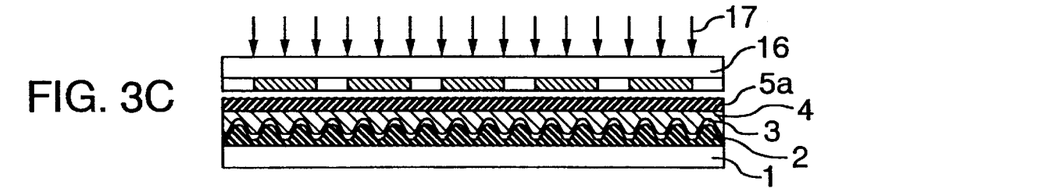
Figure 3D:
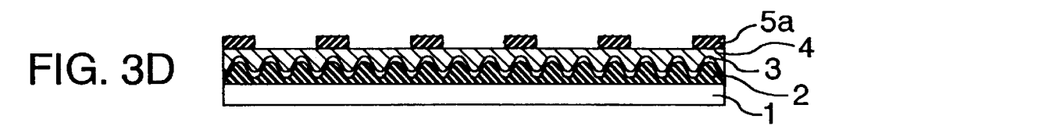
Figure 3E:
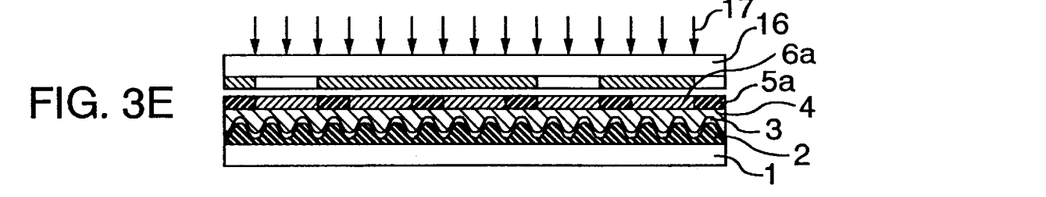
Figure 3F:
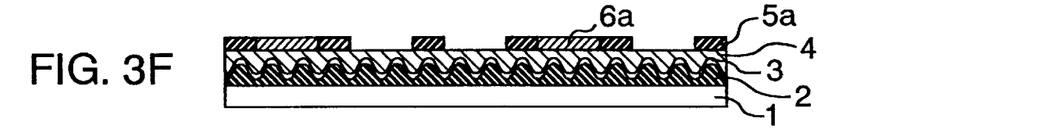
Figure 3G:
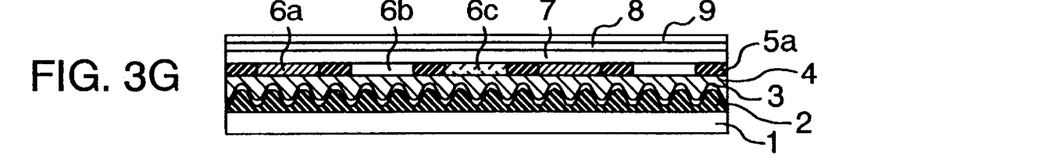
Figure 3H:
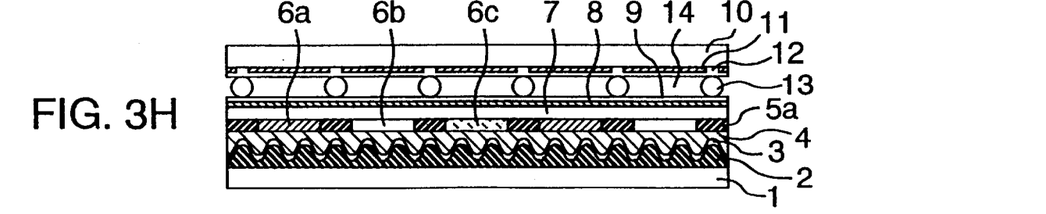

The process at the next step (b) or later is similar to the process of the second embodiment. Hence, the description thereabout is left out. The ground layer of the diffused reflector is the same as that of the first embodiment.

This embodiment is characterized by forming the ground layer of the diffused reflector in the simple manner and, like the photo-lithography technique, optionally controlling transcription of the convex or concave and convex pattern onto the ground layer having the convex portions or the convex and concave portions transcribed onto the plastics layer by controlling the exposure of ultraviolet light or curing temperature.

Like the foregoing second embodiment, in the process of forming the plastics layer 2 having the convex portions or the convex and concave portions, served as the ground layer of the diffused reflector, disadvantageously, if the unfavorable portion takes place, the plastics layer can be stripped, so that the glass substrate may be easily reused.

Fourth Embodiment

In turn, the description will be oriented to an example of the manufacturing method of another reflective LCD device according to the invention along the steps (a) to (h) shown in FIGS. 4A to 4H.

Figure 4A:
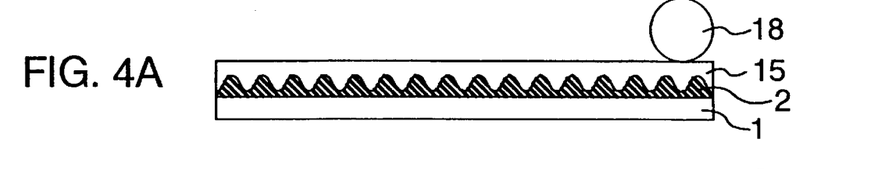
FIGS. 4A to 4H are diagrammatic sections showing process for manufacturing a reflective color liquid crystal display device according to a fourth embodiment of the present invention.

Step (a): A transcription film, composed by coating a plastics layer 2 (thickness: 1.5 am) on a polymer base film 15 having lots of concave portions formed thereon used in the first embodiment, drying the coat, and forming a protective film of polyethylene (not shown, thickness: 6 $\mu$m) on the plastics layer 2, is transcribed on a glass substrate 1 by means of a roll laminator 18 like the first embodiment. Then, the plastics layer 2 is cured in a thermostatic oven (240° C.) and for thirty min., for forming convex portions.

Figure 4B:
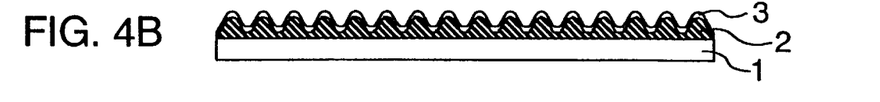

Step (b): Also like the first embodiment, a reflecting layer 3 is formed on the plastics layer 2 having lots of convex portions.

Figure 4C:
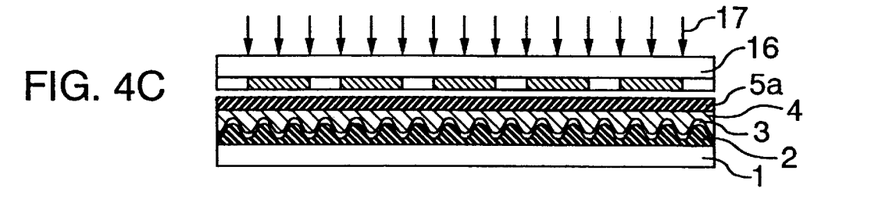

Step (c): An insulating and flatting layer 4 (composed of acrylic resin or epoxy type resin, thickness: 2.0 Am) is formed on the reflecting layer 3.

Figure 4D:
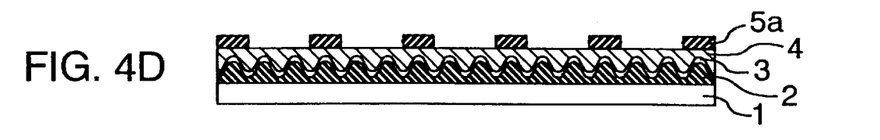

Step (d): Also like the first embodiment, a black pigment-dispersed photo polymer layer 5 is coated or laminated on the insulating and flatting layer 4.

Figure 4E:
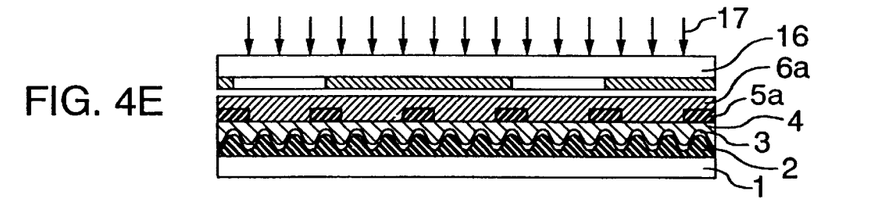

Step (e): A red pigment-dispersed photo plastics layer 6 (mother material: acrylic resin or epoxy type resin, thickness: 1.2 $\mu$m) is coated (or laminated) on the shading layer 5a. Then, the ultraviolet light 17 is applied to the layer 6 through a photo-mask 16 for exposing and developing the layer 6.

Figure 4F:
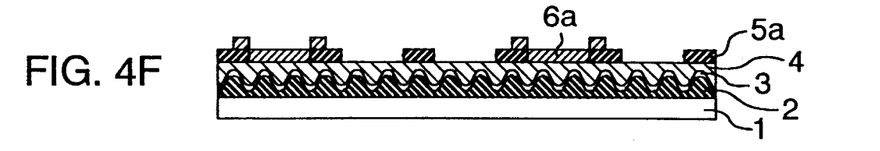

Step (f): A red colored layer 6a is formed on the shading layer 5a as columns.

Figure 4G:
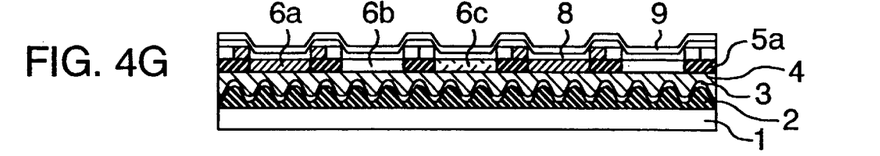

Step (g): Next, like the formation of the red colored layer 6a, a green colored layer 6b and a blue colored layer 6c are formed in sequence. Then, a transparent electrode 8 (ITO film with thickness of 260 nm, electrode is a scanning electrode) and polyimide alignment layer (thickness: 70 nm) are formed on the shading layer 5a and the colored layers 6a 6b and 6c.

Figure 4H:
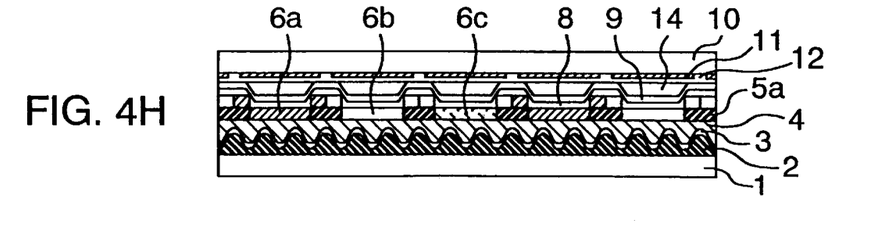

Step (h): Another electrode substrate including an electrode 11 and an alignment layer 12 on a substrate 10 is provided. Except the case that no spacer for regulating the liquid crystal thickness is used, like the first embodiment, the opposed electrode substrates are located and liquid crystal 14 is injected and sealed between both of the substrates for producing a reflective LCD device. In addition, the ground layer of the diffused reflector is the same as that of the first embodiment.

In this embodiment, without using the spacer, the columnar colored layer 6a formed on the shading layer 5a is served to regulate the thickness of the liquid crystal. Hence, it is effective for the reflective LCD device.

Fifth Embodiment

In turn, the description will be oriented to an example of the manufacturing method of another reflective LCD device according to the present invention along the steps (a) to (h) shown in FIGS. 5A to 5H.

Figure 5A:
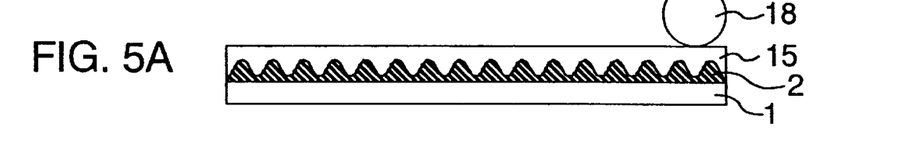
FIGS. 5A to 5H are diagrammatic sections showing a process for manufacturing a reflective color liquid crystal display device according to a fifth embodiment of the present invention.

Step (a): A transcription film is prepared by coating (thickness: 1.5 $\mu$m) the plastics layer 2 used in the first embodiment on a polymer film 15 having lots of concave portions formed thereon and served as a supporter (which film is composed of polyethylene terephthalate, thickness: 50 $\mu$m, concave pitch: about 15 $\mu$m, concave depth: 1.2 $\mu$m), drying the coat, and forming the protective film (not shown) used in the first embodiment on the plastics layer 2.

Like the first embodiment, the transcription film is transcribed on the glass substrate 1 by means of a roll laminator 18. Then, the plastics layer is cured in a thermostatic oven (240° C.) and for thirty min., for forming convex portions.

Figure 5B:
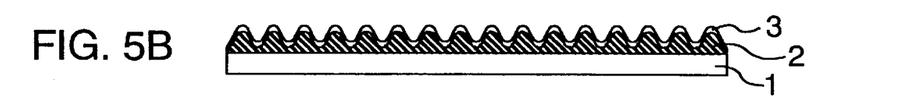

Step (b): A reflecting layer 3 (composed of aluminum or silver, thickness: 100 nm) is formed on the plastics layer 2 having convex portions.

Figure 5C:
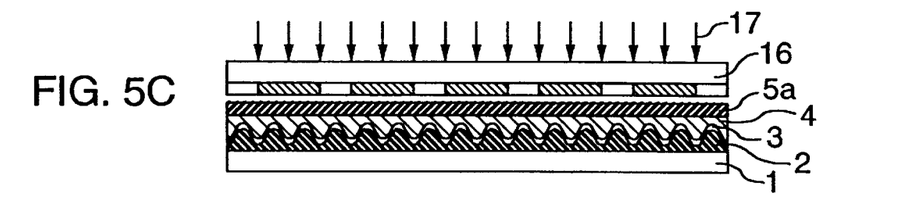

Step (c): An insulating and flatting layer 4 (composed of acrylic resin or epoxy type resin, thickness: 2 $\mu$m) is formed on the reflecting layer 3.

Figure 5D:
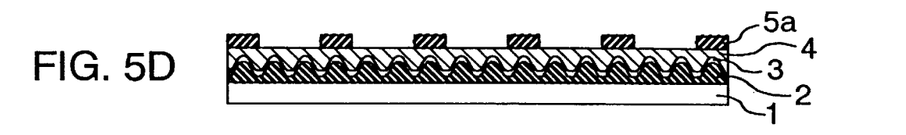

Step (d): A black pigment-dispersed photo polymer layer 5 is coated or laminated on the insulating and flatting layer 4. Then, the ultraviolet light 17 is applied to the layer 5 through the photo-mask 16 for exposing and developing the layer 5. The resulting layer 5 is made to be a shading layer 5a (mother material: acrylic resin or epoxy type resin, thickness: 1.2 $\mu$m).

Figure 5E:
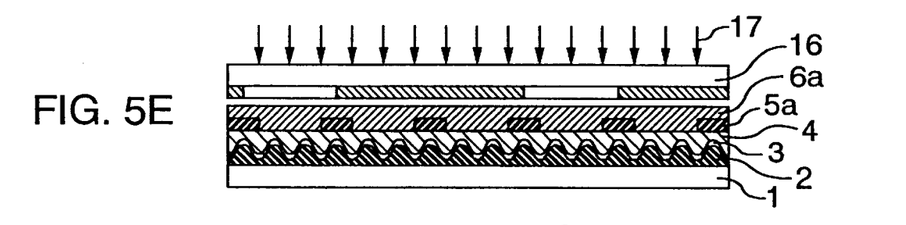

Step (e): A red pigment-dispersed photo plastics layer 6 (mother material: acrylic resin or epoxy type resin, thickness: 1.2 $\mu$m) is coated or laminated on the shading layer 5a. The ultraviolet light 17 is applied to the layer 6 through the photo-mask 16 for exposing and developing the layer 6.

Figure 5F:
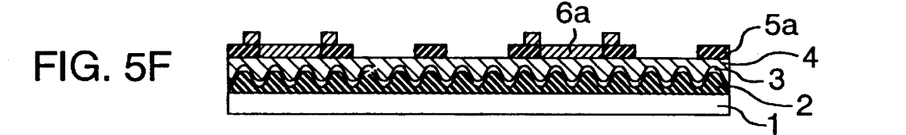

Step (f): From the photo plastics layer 6, a red colored layer 6a is formed on the shading layer 5a as columns.

Figure 5G:
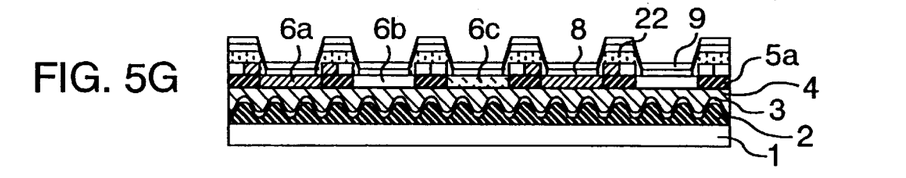

Step (g): Like the formation of the red colored layer 6a, a green colored layer 6b and a blue colored layer 6c are formed. Then, an elastic layer 22 (photosensitive resin, thickness: 1.2 $\mu$m), a transparent electrode 8 (ITO film, scanning electrode with thickness of 260 nm), and polyimide alignment layer 9 (thickness: 70 nm) are formed on the columns of the shading layer 5a and the colored layers 6a, 6b and 6c.

Figure 5H:
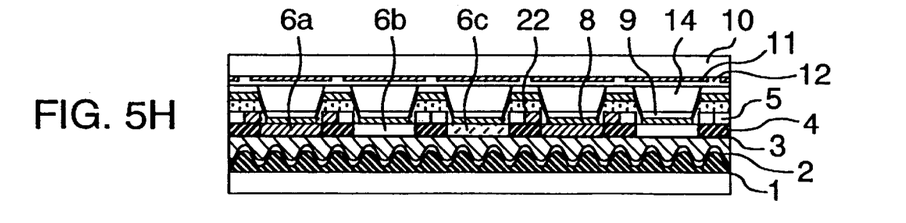

Step (h): Like the first embodiment, two electrode substrates are located in an opposed manner. Liquid crystal 14 is injected and sealed between the electrode substrates for producing a reflective LCD device. In addition, the ground layer of the diffused reflector is the same as that in the first embodiment.

The method of forming the columns of the colored layer 6 and the elastic layer 22 on the shading layer 5a for regulating the thickness of the liquid crystal is not limited to this embodiment. It is effective for the LCD device for regulating the thickness of the liquid crystal by using the spacer.

Further, it is preferable to form the columns of the colored layers 6 and the elastic layer 22 in consideration of a screen size.

Moreover, the use of the transcription-film having the colored layer (one of the black, red, green, and blue layers), the flatting layer, the reflecting layer, and the plastics layer laminated on the base film is advantageous in greatly reducing the steps in number and directly forming a color filter on the diffused reflector. If the color filter is formed on the diffused reflector by this method, it is effective in making the surface of the color filter flat.

The absence of the color filter in the opposed substrate is advantageous in connecting the TCP. Moreover, since the surface of the color filter is made flat, it is. possible to prevent reduction of a contrast ratio and brightness unevenness.

In a case that the color filter is formed on the diffused reflector, without being limited to the above method, the color filter may be formed on the diffused reflector by using the pigment resist or the transcription film, for example.

Further, if this colored layer is composed of black pigment-dispersed photo plastics, by using a colored layer that is transparent until patterning and then made black by chemical response by heating, a shading layer is formed to have a narrow line width. With this type of shading layer, it is possible to produce a reflective LCD device having a high numerical aperture (bright display).

In addition, by locating the plastics layer having convex portions or convex and concave portions only in the effective display area, the terminals of the transparent electrode may be directly formed on the glass substrate, which is more advantageous in connecting the TAB.

Sixth Embodiment

In turn, the description will be oriented to an example of the manufacturing method of another reflective LCD device according to the present invention along the steps (a) to (i) shown in FIGS. 6A to 6J.

Figure 6A:
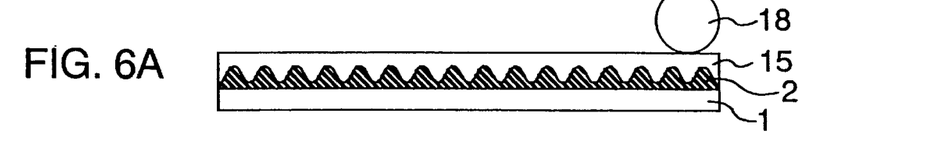
FIGS. 6A to 6J are diagrammatic sections showing a composition of a reflective color liquid crystal display device according to the present invention.

Step (a): A transcription film is prepared by forming a plastics layer 2 and a protective film on a polymer film 15 composed of polyethylene terephthalate used in the first embodiment.

The transcription film is transcribed on a glass substrate 1 by means of a roll laminator 18 under the same condition as the first embodiment. Then, the plastics layer 2 is cured in a thermostatic oven (240° C.) and for thirty min., for forming the plastics layer 2 having convex portions.

Figure 6B:
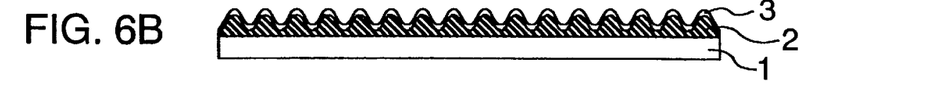

Step (b): A reflecting layer 3 of aluminum (100 nm) is formed on the plastics layer 2 having lots of convex portions.

Figure 6C:
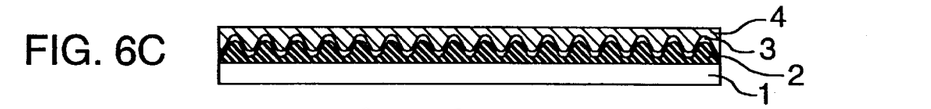

Step (c): An insulating and flatting layer 4 composed of acrylic resin (thickness: 2 $\mu$m) is formed on the reflecting layer 3.

Figure 6D:
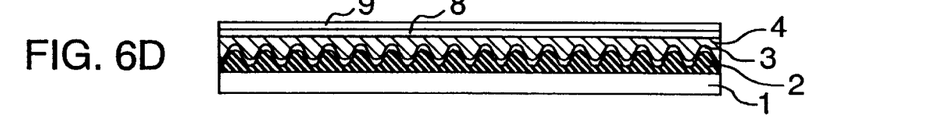

Step (d): An ITO transparent electrode 8 (signal electrode with thickness of 260 nm) and alignment layer 9 composed of polyimide type resin (70 nm) are formed on the insulating and flatting layer 4, for producing one electrode substrate.

Figure 6E:
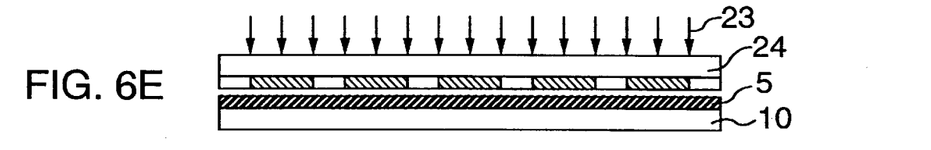

Step (e): Then, a black photo polymer black matrix having black pigment dispersed therein and composed of acrylic resin is spin-coated on the other glass substrate 10 (composed of soda glass in thickness of 0.7 mm). Then, the ultraviolet light 23 is applied to the layer 5 through the photo-mask 24 for exposing the layer 5.

Figure 6F:
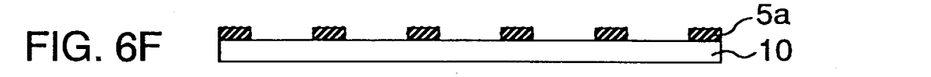

Step (f): The development of the exposed layer results in forming a shading layer 5a (thickness: 1.2 $\mu$m).

Figure 6G:
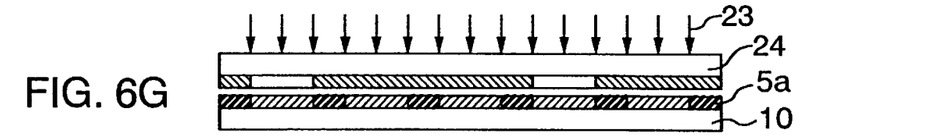

Step (g): A red pigment-dispersed photo polymer (black matrix) layer 6 composed of acrylic resin (thickness: 1.2 $\mu$m) is coated (or laminated) on the shading layer 5a. Then, the ultraviolet light 17 is applied to the layer 6 through the photo-mask 24 for exposing the layer 6. Then, the exposed layer 6 is developed.

Figure 6H:
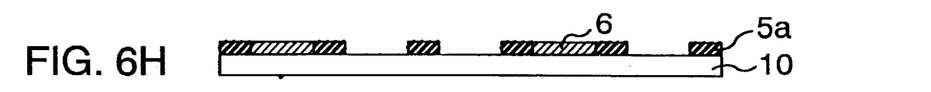

Step (h): A red colored layer 6a is formed between the columns of the shading layer 5a.

Figure 6I:
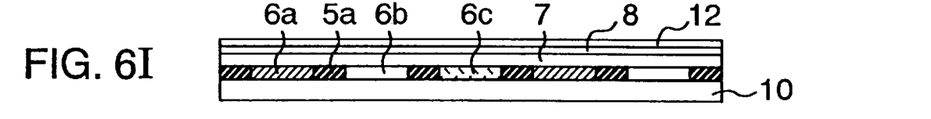
Figure 6J:
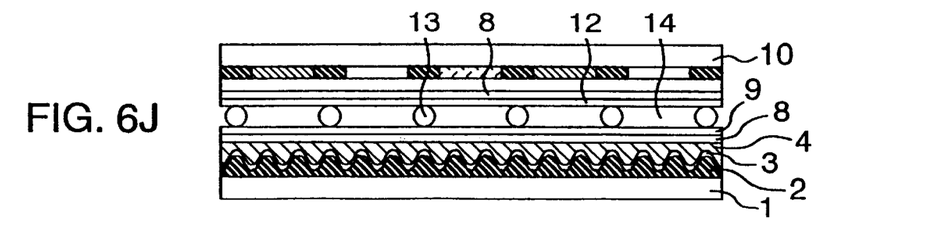

Step (i): In the same process as the red colored layer 6a, a green colored layer 6b and a blue colored layer 6c are formed. Then, a flatting layer 7 (composed of acrylic resin or epoxy type resin, thickness: 2 $\mu$m), an ITO transparent electrode 8 (scanning electrode with thickness of 260 nm), and alignment layer 12 (composed of polyimide resin, with thickness of 70 nm) are formed on the colored layers.

The reflective LCD cell is produced by locating the electrode substrate 1 formed by the steps (a) to (b) and the electrode substrate 10 formed by the steps (e) to (i) in a manner to allow the alignment layer 9 and 12 to be opposed to each other, combining the electrode substrates with each other through a spacer 13 (polymer beads), bonding and sealing the peripheral portions of the substrates by a sealing material used in the first embodiment, and injecting and sealing the liquid crystal 14 (liquid crystal mixture composed of cyano PCH and transfer derivative, index anisotropy $\Delta n$: 0.133, twisted angle: 250°) between the electrode substrates by photosensitive acrylic resin.

In this embodiment, as the ground layer of the diffused reflector, fine convex portions (semispherical portions: 15 $\mu$m in diameter×1.2 $\mu$m in height) are randomly located so as to avoid light interference. Then, an aluminum reflecting film (100 nm) is formed on the ground layer. The material, the shape, and the size of each fine convex portion may be selected according to the purpose.

In this embodiment, by forming the color filter on one glass substrate and the diffused reflector on the other glass substrate, the color filter substrate for a transparent type LCD cell may be used. This makes great contribution to lowering the cost of the reflective color LCD device.

Seventh Embodiment

Figure 7:
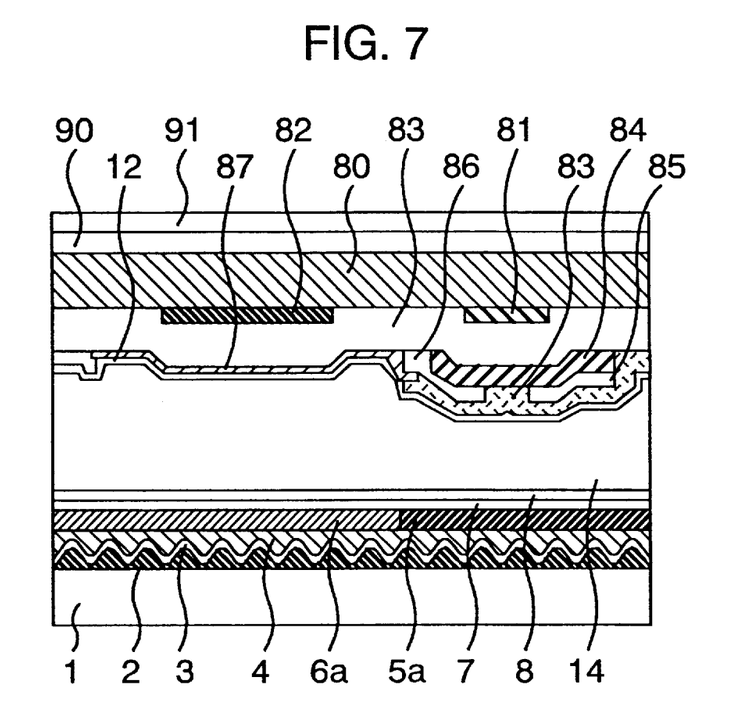
FIG. 7 is a diagrammatic section showing a composition of an active-matrix drive type liquid crystal display device according to the present invention.

The description will be oriented to an example of an active-matrix drive type LCD device having thin film transistors (TFT) with reference to FIG. 7.

One electrode substrate is formed by using the transcription film as in the first embodiment. The electrode substrate includes the glass substrate 1 (non-alkali glass plate of 0.7 mm in thickness) having lots of fine convex portions formed at the steps (a) to (g), the shading layer 5a, the red colored layer 6a, the green colored layer 6b, the blue colored layer 6c, the flatting layer 7 formed on the shading layer 5a and the colored layers 6a, 6b and 6c, an ITO transparent electrode (common electrode) 8, and alignment layer 9 in describing sequence.

The other electrode substrate includes a glass substrate 80 (composed of non-alkali glass plate of 0.7 mm in thickness), a gate electrode 81, a storage capacitance electrode 82, an insulating film 83, an amorphous silicon channel layer 84, a drain electrode 85, a source electrode 86, a pixel electrode (transparent electrode) 87, and alignment layer 12 in describing sequence.

Both of the electrode substrates are located in a manner to allow the electrodes 8 and 87 to be opposed to each other and are combined with each other through a spacer (not shown) for regulating the thickness of the liquid crystal. The peripheral portions of the substrates are bonded by a sealing material (not shown) and then the TN type liquid crystal 14 is injected and sealed between both of the electrode substrates.

Then, the reflective color LCD device is produced by locating a quarter wavelength plate 90 and a polarizer 91 and mounting a power circuit, a driving circuit, a control circuit (not shown) and so forth outside of the glass substrate 80.

Unlike the prior art, the reflective color LCD device according to this embodiment does not need a process of forming a rugged plastics film or a reflecting film by means of the photo-lithography technique and has no factor of lowering the yields of the transistor side substrate 80, thereby making the overall cost lower.

Moreover, this reflective color LCD device may directly use a TFT-formed substrate mainly used in the transparent type color LCD cell. Further, this LCD device is arranged to rotate one-quarter the light reflected on the metallic electrodes such as the gate electrode and the drain electrode by means of the quarter wavelength plate provided under the polarizer and absorbing the reflected light. Hence, the reflected light from the metallic electrodes does not lower the contrast of the display.

The description of this embodiment has concerned with a vertical electric field type active-matrix LCD cell. It holds true to a horizontal electric field type active-matrix LCD cell. In a case of applying this embodiment to the horizontal electric type cell, it is effective to form the flatting film on the color filter. Preferably, the flatting film may be formed by the transcription film as well.

Eighth Embodiment

Figure 8:
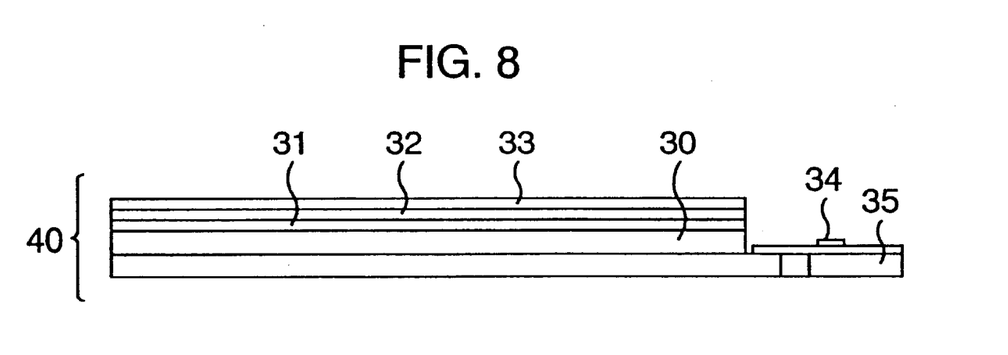
FIG. 8 is a diagrammatic section showing a composition of a reflective color liquid crystal display device according to the present invention.

In turn, the description will be oriented to an example of a reflective color LCD device according to the present invention with reference to FIG. 8.

As shown in FIG. 8, a reflective color LCD device 40 includes retardation plates 31 and 32 and a polarizer 33 located on a glass substrate having no reflector of a reflective LCD cell 30 formed thereon. The reflective color LCD device 40 is connected with a tape carrier package 34 on which an LC driver integrated circuit is mounted and a print circuit board 35 on which a power supply and a control circuit are mounted. The color LCD device 40 is integrated with those connected components by a plastics case and a metallic frame (not shown).

The reflective color LCD device produced as described above may display a high-contrast and bright image if viewed from every direction and may be supplied at lower cost than any conventional device.

Figure 9:
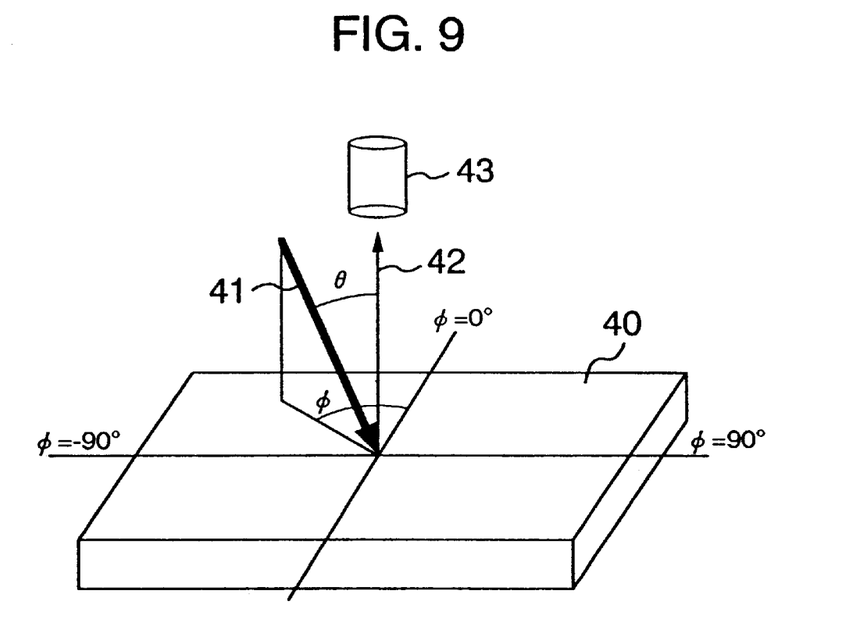
FIG. 9 is a diagrammatic perspective view showing a method for measuring a reflective characteristic of the reflective color liquid crystal display device.
Figure 10:
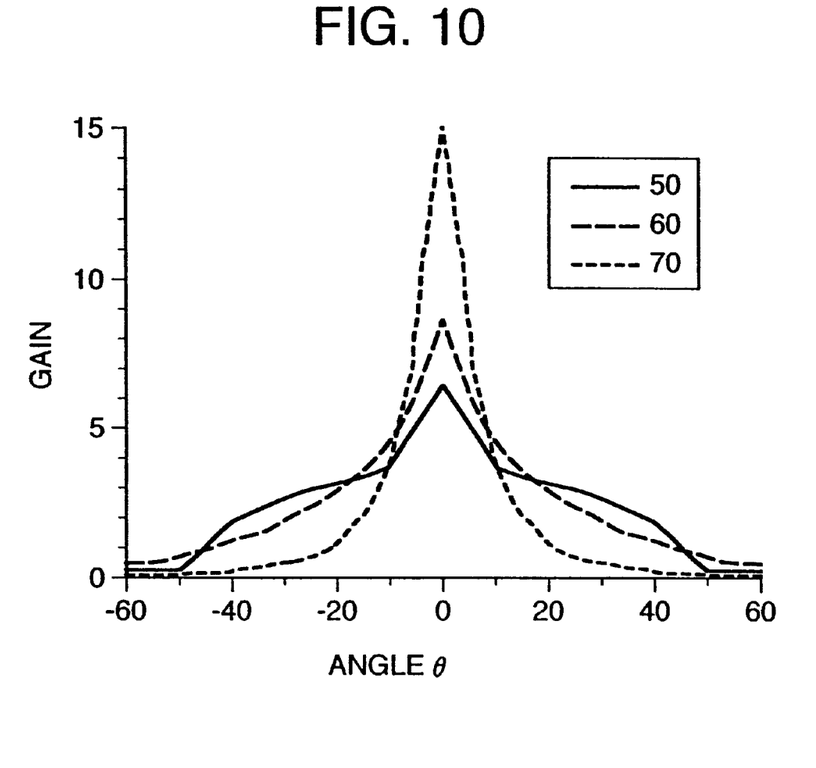
FIG. 10 is a graph showing an exemplary reflective characteristic of the reflective color liquid crystal display device.

FIG. 9 shows a method of measuring a reflective characteristic of the reflective color LCD device according to the invention. FIG. 10 shows the representative reflective characteristic measured by the method shown in FIG. 9.

The method of measuring the reflective characteristic shown in FIG. 9 is arranged to detect scattering light. 41 to the reflective color LCD device 40 by using a photo multiplier.

FIG. 10 is a graph showing an example of the reflective characteristic. The reflective characteristic is derived from the scattering light 42 detected as tilting an angle of incidence θ by ±60° with respect to a vertical of the LCD device 40.

In FIG. 10, a dotted line 70 indicates the characteristic of the reflective color LCD device arranged to have a mirror reflector as the reflector and a cell composition shown in FIG. 6 provided with the polarizer 33 and a light scattering film under the retardation plates 31 and 32.

A broken line 60 indicates a characteristic of the reflective color LCD device in which incorporated is a transcription film type diffused reflector provided with a base film served as a preliminary supporter having fine convex and concave portions formed by the sandblast technique.

Figure 11:
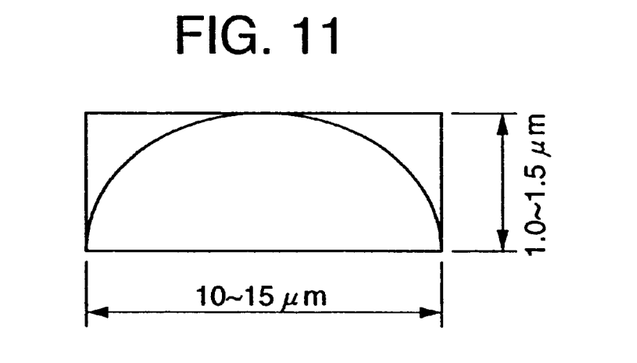
FIG. 11 is a diagrammatic section showing a form and dimensions of a spherical projection of a diffused reflector according to the present invention.

A real line 50 indicates a characteristic of the reflective color LCD device in which incorporated is a diffused reflector having semispherical projections located at random as shown in FIG. 11.

It is assured from FIG. 10 that the LCD device provided with the transcription film type diffused reflector having the semispherical projections as shown in FIG. 11 as well as the transcription film type diffused reflector with the base film processed by the sand blast can output about four or more times as great brightness as the LCD device provided with the combination of the mirror reflector with the light scattering film at an angle ø of 40°.

Further, it is also assured that the image quality of the reflective LCD device according to this embodiment is the same as or higher than that of the conventional reflective LCD device having the diffused reflector formed by the photo-lithography technique.

According to the invention, many panels are produced from one glass substrate. Hence, the invention is suitable to enlargement of the glass substrate that is required to lower the cost and is quite advantageous from economical points of view such as flat level, thinning of the black filter, effective use of the colored film material and the like.

The present invention is, therefore, effective in a liquid crystal display to be mounted on a hand-held PC, a notesized PC, a mini notesized PC, a TV set, a personal digital assistant (PDA) terminal, or the like, or a large-sized LCD for a monitor.

In particular, about the large LCD that has difficulty in keeping the image quality even, the LCD device having no spacer according to the invention can offer more excellent image quality.

In addition, the object of the present invention is to provide an LCD device in which the electrodes are formed on the built-in reflector or the built-in diffused reflector or an LCD device in which the color filter is formed on the built-in reflector or the built-in diffused reflector without having to lower the voltage to be applied onto the liquid crystal layer. It means that the invention does not have any limited display system.

According to the present invention, (1) A reflective LCD device, which is provided with the built-in diffused reflector of the transcription film type or the die type to be easily worked to any form and having the well-reproducible concave and convex surface and has a bright display if viewed from every direction, ay be produced at low cost.

(2) Since the reflector and the color filter are located on the same substrate, the yields of the LCD cell is high. Hence, the reflective LCD device having a high contrast, a high transmittance, and an even display characteristic can be produced at low cost.

(3) Since the thickness of the liquid crystal can be regulated without using the spacer, the reflective or transmissive LCD device for displaying a quite uniform image can be produced at low cost.

(4) The use of the (transparent or colored) transcription film makes it possible to remove the flatting layer and effectively use the space as compared with the use of the liquid resist or color resist. This is effective in lowering the producing cost.

What is claimed is:

1. A method of manufacturing a reflective liquid crystal display device comprising the steps of:

preparing a transcription film which is configured by a base film having a multiplicity of convex portions or concave portions or convex/concave portions formed thereon, and a resin layer formed on said base film and having a surface accorded to the convex/concave surface of the base film;

laminating said transcription film on a substrate and stripping said base film of said transcription film off said resin layer thereby to dispose said resin layer having the convex/concave surface on said substrate; and forming a reflection film on said resin layer having the convex/concave surface.

2. A method of manufacturing a reflective liquid crystal display device according to claim 1, wherein said resin layer is formed by thermosetting resin.

3. A method of manufacturing a reflective liquid crystal display device according to claim 1, wherein said resin layer is formed by photosensitive resin.

4. A method of manufacturing a reflective liquid crystal display device according to claim 1, wherein said transcription film is laminated on said substrate by heating and pressing said transcription film on said substrate.

5. A method of manufacturing a reflective type liquid crystal display device according to claim 4, wherein said transcription film is heated at a temperature within a range from 50° C. to 150° C. and pressed at a pressure in a range from 1 $Kg/cm^2$ to 12 $Kg/cm^2$.

* * * * *